United States Patent
Bischoff

(10) Patent No.: US 7,219,756 B2
(45) Date of Patent: May 22, 2007

(54) METHOD FOR SETTING AN OPERATING POINT OF A HYBRID DRIVE OF A VEHICLE

(75) Inventor: Claus Bischoff, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 132 days.

(21) Appl. No.: 10/503,102

(22) PCT Filed: Sep. 10, 2002

(86) PCT No.: PCT/DE02/03360

§ 371 (c)(1),
(2), (4) Date: Jan. 25, 2005

(87) PCT Pub. No.: WO03/064200

PCT Pub. Date: Aug. 7, 2003

(65) Prior Publication Data

US 2005/0126836 A1 Jun. 16, 2005

(30) Foreign Application Priority Data

Jan. 28, 2002 (DE) ............................ 102 03 064

(51) Int. Cl.
*B60K 1/02* (2006.01)
(52) U.S. Cl. .................. 180/65.2; 701/22; 903/942
(58) Field of Classification Search ...................... None
See application file for complete search history.

(56) References Cited

U.S. PATENT DOCUMENTS 5,903,112 A * 5/1999 Yamada et al. ............... 318/10
6,131,680 A * 10/2000 Nii et al. .................. 180/65.2
6,190,283 B1 * 2/2001 Uchida ............................ 477/5
6,278,915 B1 * 8/2001 Deguchi et al. ............... 701/22
6,356,817 B1 * 3/2002 Abe .............................. 701/22
6,819,006 B2 * 11/2004 Nakajima et al. ......... 290/40 C

FOREIGN PATENT DOCUMENTS

| DE | 196 48 055 | 6/1998 |
|---|---|---|
| DE | 199 30 391 | 1/2000 |
| DE | 100 07 136 | 9/2000 |
| DE | 100 24 235 | 12/2000 |
| DE | 199 38 623 | 5/2001 |
| EP | 830 968 | 9/1996 |
| JP | 8322108 | 12/1996 |
| JP | 2000236601 | 8/2000 |
| JP | 2000236602 | 8/2000 |
| JP | 2000333304 | 11/2000 |
| JP | 2002271913 | 9/2002 |

OTHER PUBLICATIONS

Heinrich Hubscher et al., Elektrotechnik Grundbidung, Westermann Schulbuchverlag GmbH, 2 Ed., 1991, ISBN 3-14-221030-X S 104, 105.

* cited by examiner

*Primary Examiner*—Christopher Bottorff
(74) *Attorney, Agent, or Firm*—Kenyon & Kenyon LLP

(57) ABSTRACT

A method for setting an operating point of a hybrid drive of a vehicle is provided, the hybrid drive including an internal combustion engine and at least two electric motors/generators as propulsion engines, and the output shafts of the propulsion engines being operatively linkable to a drive train of the vehicle. Depending on a desired output torque and an instantaneous vehicle velocity, operating points of the electric motors/generators are set in such a way that the sum of the mechanical output and the electrical losses of all electric motors/generators of the hybrid drive equals zero.

10 Claims, 3 Drawing Sheets

METHOD FOR SETTING AN OPERATING POINT OF A HYBRID DRIVE OF A VEHICLE

FIELD OF THE INVENTION

The present invention relates to a method for setting an operating point of a hybrid drive of a vehicle, the hybrid drive including an internal combustion engine and at least two electric motors/generators as propulsion, and the output shafts of the propulsion engines being operatively linkable to a power train of the vehicle.

BACKGROUND INFORMATION

In the known hybrid drives addressed here, an internal combustion engine is combined with at least two electric motors/generators, so that a plurality of drive sources for the vehicle are available. According to requirements specified by a vehicle driver, the drive sources may optionally feed their driving torque into a power train of the vehicle. This results in various drive configuration possibilities depending on the driving situations, which drive configurations are used to improve ride comfort and to reduce energy use, as well as to reduce pollutant emission.

In hybrid drives for vehicles, serial arrangements, parallel arrangements and mixed arrangements of internal combustion engine and electric motors/generators are known. Depending on the arrangement, the electric motors/generators may be connected to the power train of the internal combustion engine directly or indirectly. For the mechanical linkage of the internal combustion engine and/or the electric motors/generators, it is known to arrange them in such a way that they are mechanically linkable with each other using a transmission, e.g., a planetary transmission, or the like, and clutches.

Optimum implementation of a driver's desired driving power from the hybrid drive requires coordinated activation of the propulsion engines of the hybrid drive, which is accomplished by a device known as an engine control unit. In every driving situation of the vehicle, the driver's wish must be satisfied in an optimum way with the resources provided by the vehicle. Known operating strategies for hybrid drives define an optimized operating point for the internal combustion engine, depending on specific input values such as driving power demand, vehicle velocity, roadway gradient, and the like. An effort is made to operate the internal combustion engine outside of the least efficient partial load range, insofar as possible, and to shut it off at minimum desired power output levels, if appropriate. In these cases, the at least one electric motor/generator takes over the propulsion of the vehicle. It is also known to control the internal combustion engine along an optimum fuel consumption characteristic curve. A disadvantage of these known operating strategies is that the efficiencies of the electric propulsion engines and the effects of the operating behavior of the electric propulsion engines on electric energy storage devices (batteries) are ignored.

SUMMARY

The method according to the present invention has the advantage over the related art that in the case of a hybrid drive having an internal combustion engine and at least two electric motors/generators, the efficiencies of the electric drive components and the effects of the operating behavior of the electric propulsion engines on electric energy storage devices are also considered in setting an operating point of the hybrid drive. Because operating points of the electric motors/generators are set as a function of a desired output torque and an instantaneous vehicle velocity, so that the sum of the mechanical power outputs and the electrical losses of all electric motors/generators of the hybrid drive is zero, this produces the advantageous result that, when the hybrid drive is at rest, the electric energy storage devices remain uninvolved and their battery output is regulated to be zero.

Hybrid drives having electric motors/generators use high-performance batteries, which are significant in cost. Because the operating strategy of the electric motors/generators regulates the battery output to be zero when the vehicle is stopped, the demand on the high-performance batteries is reduced, and hence their total service life is extended. In particular, the service life of the high-performance battery may thereby be matched to the service life of the vehicle that has the hybrid drive. This results in economic savings, which significantly increase the effectiveness of the hybrid drives. At the moment when the sum of the mechanical outputs and the electrical losses of all the electric motors/generators is zero, electric motors/generators operating as motors are supplied with energy by at least one electric motor operating as a generator, which in addition covers all the electrical losses of the electric motors/generators. This makes it possible to regulate the battery output to be zero when the vehicle is stopped.

An example embodiment of the present invention provides that, when setting the operating points of the electric motors/generators, attention is paid to at least one optimization criterion, e.g., minimum instantaneous fuel consumption of the internal combustion engine. This allows the operating point of the hybrid drive to be chosen in such a way that, in addition to low demand on the high-performance batteries over their total service life, it is also possible to achieve the lowest possible fuel consumption and thus the lowest possible emission of pollutants from the hybrid drive.

DETAILED DESCRIPTION

Figure 1:
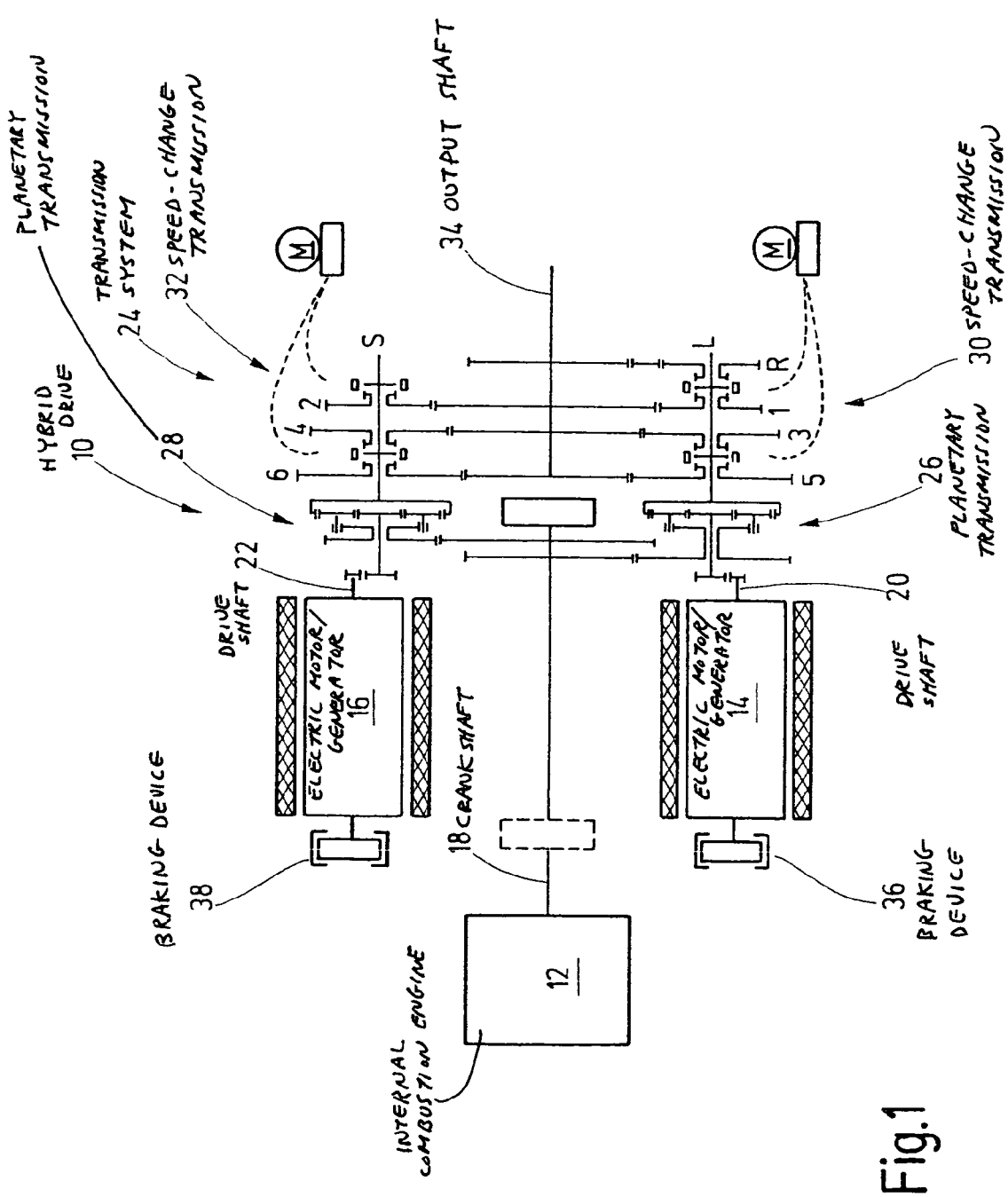
FIG. 1 shows a schematic view of a hybrid drive.

FIG. 1 shows a schematic view of a hybrid drive 10 of a motor vehicle. Hybrid drive 10 includes an internal combustion engine 12, and a first electric motor/generator 14 and a second electric motor/generator 16. A crankshaft 18 of engine 12 and drive shafts 20 and 22 of electric motors/generators 14 and 16 are mechanically linked to a transmission system 24. Drive shaft 20 is connected to a first planetary transmission 26, and drive shaft 22 to a second planetary transmission 28. A ring gear of planetary transmission 26 is connected to a speed-change transmission 30, and a ring gear of planetary transmission 28 is connected to a speed-change transmission 32. Speed-change transmissions 30 and 32 in turn are connected to an output shaft 34 of transmission system 24. Output shaft 34 is mechanically linked to a drive shaft of the motor vehicle, not shown.

The construction and manner of operation of such a hybrid drive 10 are generally known, so that the present description will not go into it in further detail. By selectively activating engine 12 and/or electric motors/generators 14 and 16, it is possible to deliver a different driving torque to output shaft 34. Thus it is possible to set different operating modes of hybrid drive 10. By operating a gear selector, speed-change transmissions 30 and 32 permit various gears, designated here as gears 1, 2, 3, 4, 5 and 6, and a reverse gear R, are engageable. Electric motors/generators 14 and 16 may each be operated in generator mode or motor mode, and are used, for example, to provide an on-board supply voltage for the motor vehicle and to charge a rechargeable battery. Electric motors/generators 14 and 16 have braking devices 36 and 38 associated with them, by which rotors of electric motors/generators 14 and 16 may be mechanically braked.

Figure 2:
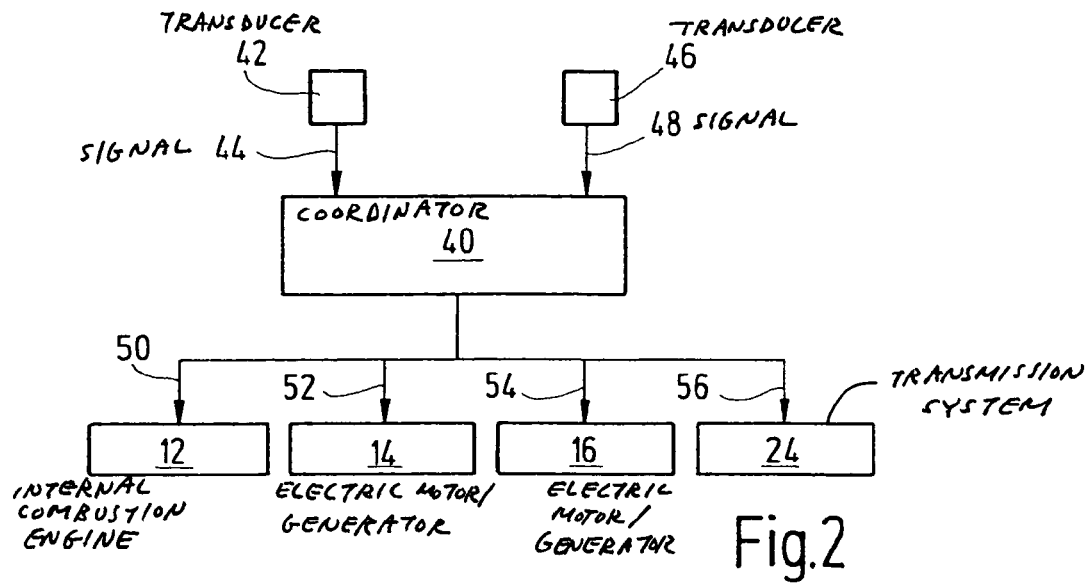
FIG. 2 shows a block diagram of a method for setting an operating point of the hybrid drive.

FIG. 2 shows a block diagram of a portion of an engine control device for actuating hybrid drive 10. The engine control device includes a coordinator 40 for specifying a characteristic-diagram-based operating strategy for hybrid drive 10. The operating strategy sets an optimum operating point of hybrid drive 10, as explained below.

From a transducer 42, coordinator 40 receives a signal 44 that corresponds to the instantaneous velocity v of the vehicle. From a transducer 46, coordinator 40 receives a signal 48 that corresponds to an output torque desired by a vehicle's driver. Transducer 46 may operate, for example, in coordination with an accelerator pedal, a brake pedal or an automatic driving control system of the vehicle.

From input signals 44 and 48, coordinator 40 determines signals 50, 52, 54, 56 for activating engine 12, electric motors/generators 14 and 16 and transmission system 24. Signal 50 contains a speed specification and a torque specification for engine 12, signal 52 contains a speed specification and a torque specification for electric motor 14, signal 54 contains a speed specification and a torque specification for electric motor 16, and signal 56 contains a gear step specification for transmission system 24.

To carry out the characteristic-map-based operating strategy, coordinator 40 uses characteristic maps. The starting point for determining these characteristic maps is the equivalent diagram for hybrid drive 10 illustrated in FIG. 3. Hybrid drive 10 includes engine 12, electric motors/generators 14 and 16, and transmission system 24. Associated with electric motors/generators 14 and 16 is a high-performance battery 58, which is fed by electric motors/generators 14 and 16 in generator mode, and which battery feeds electric motors/generators 14 and 16 when they are in motor mode. In the normal case, one electric motor operates in motor mode and one electric motor operates in generator mode.

A tank 60 is provided to supply engine 12 with fuel, an instantaneous fuel consumption rate 62 being determined. Hybrid drive 10 delivers an output power P to output shaft 34. Output power P is a function of the vehicle velocity v (signal 44) and the desired output torque M (signal 48).

Figure 3:
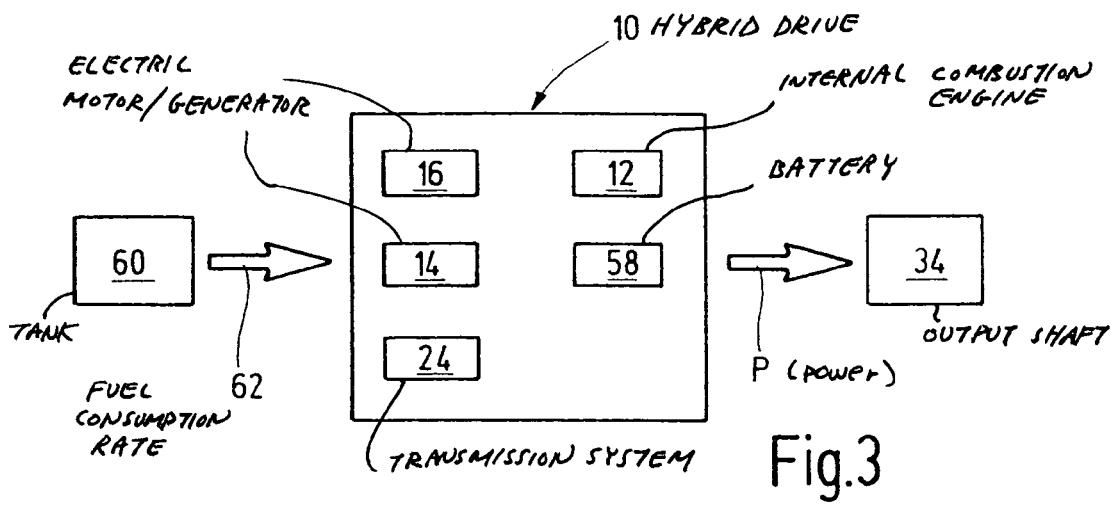
FIG. 3 shows an equivalent diagram of the hybrid drive.

On the basis of this equivalent diagram shown in FIG. 3, an optimization criterion is defined, which is represented, for example, by minimum instantaneous fuel consumption rate 62.

A driving state of the vehicle is defined through the output power P, and hence through instantaneous velocity v and desired output torque M. These driving states are implemented through operating points of the drive train, i.e., through operating points of engine 12, electric motors/generators 14 and 16, and transmission system 24.

For the present invention, the sum of the mechanical power outputs of electric motors/generators 14 and 16, and the electrical losses of electric motors/generators 14 and 16, equals zero. This means that one of the electric motors/generators 14 and 16 operates in generator mode and the other of the electric motors/generators 14 and 16 operates in motor mode. In so doing, the electric motor operating in generator mode supplies the electric motor operating in motor mode with energy, and in addition covers all the electric losses of the two electric motors/generators 14 and 16. The result is that for this assumed steady-state operating state the power output of battery 58 is regulated to be zero.

From the set of all possible drive train operating points with which one of the operating states, defined through output power P, is implementable, coordinator 40 thus first determines all operating points of engine 12, electric motors/generators 14 and 16, and transmission system 24 that satisfy the requirement that the sum of the mechanical output and electrical losses of the electric motors/generators equals zero.

These optimized operating points of engine 12, electric motors/generators 14 and 16, and transmission system 24 that satisfy these boundary conditions are subjected to an additional optimization criterion, namely, according to the example, a minimum possible instantaneous fuel consumption 62. This produces fuel-consumption-optimized operating points of engine 12, electric motors/generators 14 and 16, and transmission system 24. These fuel-consumption-optimized operating points are stored in control characteristic maps, which are used by coordinator 40. Since these control characteristic maps are derived from operating characteristic maps of the involved units, i.e., engine 12, electric motors 14 and 16, and transmission system 24, these control characteristic maps also implicitly make allowance for the operating limits of those units, such as maximum speed or full load characteristic curves, so that they do not have to be requested separately.

Figure 4:
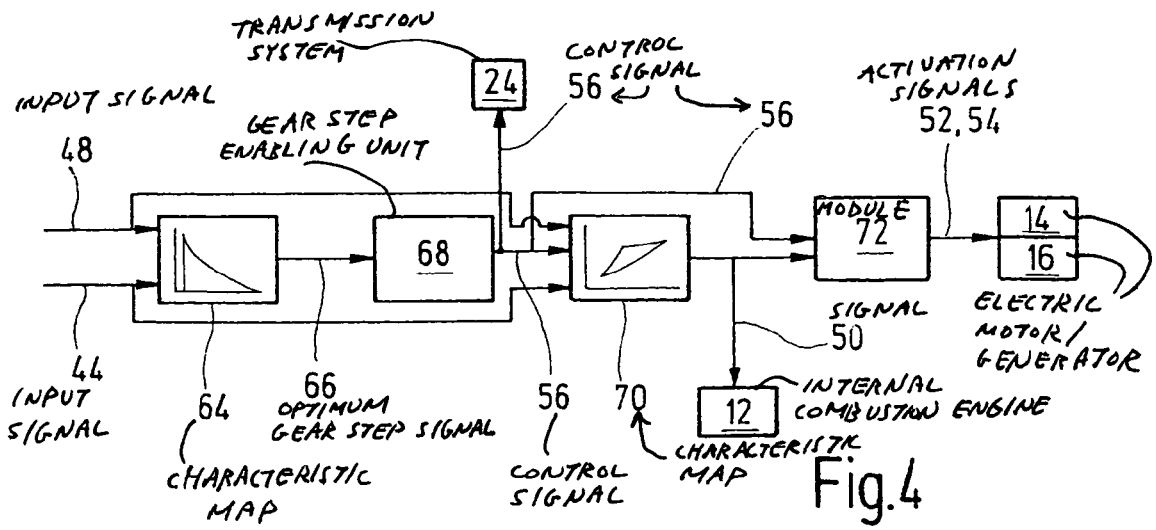
FIG. 4 shows a block diagram of an operating strategy for the hybrid drive.

FIG. 4 shows a block diagram of the method according to the present invention for setting the operating point of hybrid drive 10 by coordinator 40. First input signals 44 (instantaneous velocity v) and 48 (desired output torque) are linked to a characteristic map 64 that specifies an optimum gear step for transmission system 24. This signal 66 corresponding to the optimum gear step is fed to a gear step enabling unit 68, which enables the optimum gear step as the setpoint gear step and issues control signal 56. The enabling of the setpoint gear step may be made as a function of additional parameters, for example to prevent shifting while in a curve, double shifting, etc. Signal 56 is provided to transmission system 24 for setting the gear step. Signal 56 is also linked to a characteristic map 70 to determine a setpoint operating point of engine 12. The resulting signal 50 is supplied to engine 12 and to a module 72. Module 72 gates signal 50 with signal 56 and supplies signals 52 and 54 for activating electric motors/generators 14 and 16, which correspond to their optimum operating points.

The representation in FIG. 4 makes it clear that the method according to the present invention is easily implemented. Simultaneous calculations of the possible operating points of the units of hybrid drive 10 for different gear steps are not necessary, so that no major computing effort is needed. The gear steps are enabled immediately after the optimum gear step is determined, so that in the event that enabling of the optimum gear step is prevented, the subsequent steps to determine signals 50, 52 and 54 do not have to be performed unnecessarily. The capacity that is not claimed by this may be used to search for an alternate approach, for example a different gear step. This characteristic-map-based operating strategy, into which characteristic maps 64 and 70 are incorporated, produces a very reliable control system, in which the resources used for monitoring the units of hybrid drive 10 may be reduced to a minimum, since the characteristic maps of the operating strategy already ensure that no non-permissible operating points of the units are activated.

An adaptation to different hybrid drives 10, e.g., hybrid drives 10 having a different number of gear levels, is easily implemented due to the modular structure of the control system, since it is merely necessary to adapt control characteristic map 64 and gear step enabling unit 68.

Figure 5:
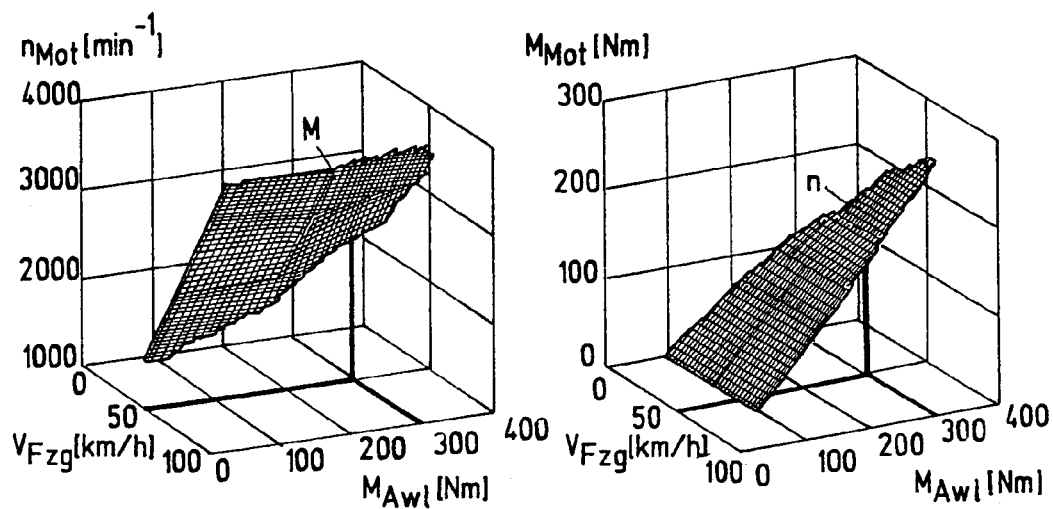
FIG. 5 shows characteristic maps for optimized operating points of the internal combustion engine of the hybrid drive.

FIG. 5 shows exemplary characteristic maps 70, by which the optimized operating points of engine 12 are determinable. Each driving state that is characterized by vehicle velocity v (signal 44) and the desired output torque (signal 48) has a setpoint torque $M_{setpoint}$ and a setpoint speed $n_{setpoint}$ associated with it. These values corresponding to the optimized operating points are fed to engine 12 and to module 72 (FIG. 4) as signal 50 (FIG. 4).

Figure 6:
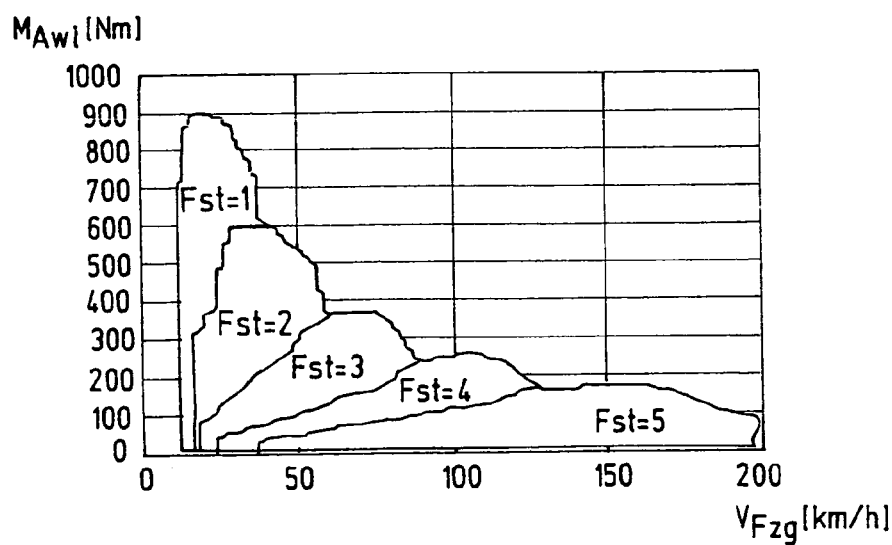
FIG. 6 shows an optimized characteristic diagram of the gear steps of the hybrid drive.

FIG. 6 shows control characteristic map 64 for selecting the optimum gear step. It is possible here, depending on vehicle velocity v (signal 44) and the desired torque M (signal 48), to implement driving states that are settable using different gear steps. By linking with instantaneous fuel consumption optimization 62, one obtains the optimized gear step characteristic map depicted for example in FIG. 6, on the basis of which signal 66 (FIG. 4) is output as a function of velocity v and the desired output element n.

If the above general explanations are applied to hybrid drive 10 shown in FIG. 1, a total of seven system variables result, namely torques and speeds for the two electric motors/generators 14 and 16 and for engine 12, as well as the gear step of transmission system 24 as a combination of two gear steps of speed-change transmissions 30 and 32. Transmission system 24, as the coupling element for engine 12, electric motors/generators 14 and 16, and output shaft 34, delivers four boundary conditions i.e., two kinematic boundary conditions for the speeds of the units and two dynamic coupling conditions for the torques of the units. With attention to minimizing the instantaneous fuel consumption, these boundary conditions may be taken into account in determining the optimum gear step for minimum instantaneous fuel consumption by engine 12 and setting the output of battery 58 to zero.

What is claimed is:

1. A method for setting an operating point of a hybrid drive of a vehicle, the hybrid drive including an internal combustion engine and at least two electric motors as propulsion engines, and the output shafts of the propulsion engines being selectively, operatively linked to a drive train of the vehicle, comprising:
    setting operating points of the electric motors depending on a desired drive torque and an instantaneous vehicle velocity;
    wherein the operating points are set such that the sum of the mechanical output and the electrical losses of all the electric motors of the hybrid drive is zero, and wherein one electric motor operating in generator mode supplies the other electric motor operating in motor mode with energy and compensates for all electrical losses of both electric motors, and wherein at least one optimization criterion is taken into account when setting the operating points of the electric motors, and wherein minimum instantaneous fuel consumption rate of the internal combustion engine is used as an optimization criterion.

2. The method as recited in claim 1, wherein the operating point of the hybrid drive is set with the aid of a control characteristics map.

3. The method as recited in claim 1, wherein the speed and torque of the internal combustion engine and the electric motors, and a gear step for a transmission system of the vehicle, are specified.

4. The method as recited in claim 3, wherein an optimum gear step is determined, and the determined optimum gear step is enabled as a setpoint gear step, depending on defined operating states of the vehicle.

5. The method as recited in claim 1, wherein the operating point of the hybrid drive is set with the aid of a control characteristics map.

6. The method as recited in claim 1, wherein all possible drive train operating points are first determined, and from the determined possible drive train operating points, the operating points that take into account the at least one optimization criterion are determined.

7. The method as recited in claim 6, wherein the determined operating points that take into account the at least one optimization criterion are stored in at least one characteristic map, and wherein the characteristic map is accessed for setting the operating point of the hybrid drive.

8. A method for setting an operating point of a hybrid drive of a vehicle, the hybrid drive including an internal combustion engine and at least two electric motors as propulsion engines, and the output shafts of the propulsion engines being selectively, operatively linked to a drive train of the vehicle, comprising:
    setting operating points of the electric motors depending on a desired drive torque and an instantaneous vehicle velocity;
    wherein the operating points are set such that the sum of the mechanical output and the electrical losses of all the electric motors of the hybrid drive is zero, and wherein one electric motor operating in generator mode supplies the other electric motor operating in motor mode with energy and compensates for all electrical losses of both electric motors, and wherein all possible drive train operating points are first determined, and from the determined possible drive train operating points, the operating points that take into account at least one optimization criterion are determined.

9. The method as recited in claim 8, wherein the determined operating points that take into account the at least one optimization criterion are stored in at least one characteristic map, and wherein the characteristic map is accessed for setting the operating point of the hybrid drive.

10. A method for setting an operating point of a hybrid drive of a vehicle, the hybrid drive including an internal combustion engine and at least two electric motors as propulsion engines, and the output shafts of the propulsion engines being selectively, operatively linked to a drive train of the vehicle, comprising:
    setting operating points of the electric motors depending on a desired drive torque and an instantaneous vehicle velocity;
    wherein the operating points are set such that the sum of the mechanical output and the electrical losses of all the electric motors of the hybrid drive is zero, and wherein one electric motor operating in generator mode supplies the other electric motor operating in motor mode with energy and compensates for all electrical losses of both electric motors, and wherein an optimum gear step is determined, and the determined optimum gear step is enabled as a setpoint gear step, depending on defined operating states of the vehicle.

* * * * *